(12) United States Patent  (10) Patent No.: US 8,724,271 B2
Lai et al.  (45) Date of Patent: May 13, 2014

(54) ESD-ROBUST I/O DRIVER CIRCUITS

(75) Inventors: Da-Wei Lai, Singapore (SG);
Ying-Chang Lin, Singapore (SG);
Mahadeva Iyer Natarajan, Clifton Park, NY (US)

(73) Assignee: GLOBALFOUNDRIES Singapore Pte. Ltd., Singapore (SG)

(*) Notice: Subject to any disclaimer, the term of this patent is extended or adjusted under 35 U.S.C. 154(b) by 1 day.

(21) Appl. No.: 13/415,178

(22) Filed: Mar. 8, 2012

(65) Prior Publication Data
US 2013/0235496 A1  Sep. 12, 2013

(51) Int. Cl.
*H02H 3/22* (2006.01)

(52) U.S. Cl.
USPC ............................................. 361/56; 361/111

(58) Field of Classification Search
USPC .................................................... 361/56, 111
See application file for complete search history.

(56) References Cited

U.S. PATENT DOCUMENTS

| 6,529,359 | B1* | 3/2003 | Verhaege et al. | 361/100 |
| 2003/0235022 | A1* | 12/2003 | Lai et al. | 361/111 |
| 2004/0105201 | A1 | 6/2004 | Wu et al. | |
| 2005/0275987 | A1 | 12/2005 | Wu et al. | |
| 2006/0268473 | A1* | 11/2006 | Kemper | 361/56 |

* cited by examiner

*Primary Examiner* — Danny Nguyen
(74) *Attorney, Agent, or Firm* — Ditthavong Mori & Steiner, P.C.

(57) ABSTRACT

An ESD-robust I/O driver circuit is disclosed. Embodiments include providing a first NMOS transistor having a first source, a first drain, and a first gate; coupling the first source to a ground rail and the first drain to an I/O pad; coupling a gate driver control circuit to the first drain and the first gate; and providing a ground potential to the first gate, via the gate driver control circuit, during an ESD event occurring from the I/O pad to the ground rail.

18 Claims, 4 Drawing Sheets

ESD-ROBUST I/O DRIVER CIRCUITS

TECHNICAL FIELD

The present disclosure relates to electrostatic discharge (ESD) robust input/output (I/O) driver circuits. The present disclosure is particularly applicable to I/O driver circuits in 65 nanometer (nm) technology nodes and beyond.

BACKGROUND

FIG. 1 schematically illustrates a traditional general purpose I/O (GPIO) driver circuit. As shown, the circuit in FIG. 1 includes PMOS transistor 101 and NMOS transistor 103 coupled at their drains, which are further coupled to I/O pad 105 and ESD device 107. The source of PMOS transistor 101 is connected to power rail 109 (e.g., VDD) and the source of NMOS transistor 103 is connected to ground rail 111 (e.g., VSS). Under ESD zapping from PAD to VSS, ESD current may, for instance, travel through paths 113a (e.g., from I/O pad 105 to ground rail 111 through ESD device 107) and 113b (e.g., from I/O pad 105 to ground rail 111 through power clamp 115). Paths 113a and 113b are desired ESD bypass paths that are designed as bypass paths for ESD current. However, because control logic circuit 117 may leave the gate of NMOS transistor 103 coupled to a high state (e.g., gate node 119 may be floating) during an ESD event, the ESD current may also travel through undesired path 113c (e.g., from I/O pad 105 to ground rail 111 through NMOS transistor 103). Since NMOS transistor 103 is typically fully-silicided and much smaller in size than ESD device 107, NMOS transistor 103 will burn out much quicker from the ESD current. Thus, the ESD performance of GPIO drivers may be poor despite robust ESD protection devices included in the circuit (e.g., due to the drastic impact ESD current may have on driver transistors).

FIG. 2 schematically illustrates one solution to the floating gate issue in the circuit of FIG. 1 (e.g., gate node 119 being left floating). Like the circuit in FIG. 1, the circuit in FIG. 2 is a GPIO driver circuit that includes PMOS transistor 201 and NMOS transistor 203 coupled at their drains, which are further coupled to I/O pad 205 and ESD device 207. Moreover, power rail 209 is connected to the source of PMOS transistor 201 and ground rail 211 is connected to the source of NMOS transistor 203. The circuit in FIG. 2 also includes desired, designed paths 213a (e.g., from I/O pad 205 to ground rail 211 through ESD device 207) and 213b (e.g., from I/O pad 205 to ground rail 211 through power clamp 215) for ESD current during an ESD event. However, as shown, the ESD current will also flow through parasitic diode 217 (e.g., through path 213c) to activate level shift 219 that will, in turn, feed a ground potential to gate node 221 at the gate of NMOS transistor 203, turning off NMOS transistor 203 during the ESD event. Consequently, ESD current is prevented from flowing through and burning out NMOS transistor 203. Nonetheless, this particular solution may not work for other types of I/O driver circuits. For example, this solution is inapplicable in open-drain I/O driver circuits where there is no parasitic path from the I/O pad to the power rail (e.g., parasitic path 213c does not exist in open-drain I/O driver circuits).

A need therefore exists for an effective ESD solution for other I/O driver circuits (e.g., open-drain I/O driver circuits), and enabling methodology.

SUMMARY

An aspect of the present disclosure is an ESD-robust I/O driver circuit.

Another aspect of the present disclosure is a method for implementing an ESD-robust I/O driver circuit.

Additional aspects and other features of the present disclosure will be set forth in the description which follows and in part will be apparent to those having ordinary skill in the art upon examination of the following or may be learned from the practice of the present disclosure. The advantages of the present disclosure may be realized and obtained as particularly pointed out in the appended claims.

According to the present disclosure, some technical effects may be achieved in part by a circuit including: a first NMOS transistor having a first source, a first drain, and a first gate, the first source being coupled to a ground rail and the first drain being coupled to an I/O pad; and a gate driver control circuit coupled to the first drain and the first gate, wherein the gate driver control circuit provides a ground potential to the first gate during an ESD event occurring from the I/O pad to the ground rail.

Aspects include a circuit having the gate driver control circuit including a second NMOS transistor having a second source, a second drain, and a second gate; and a first PMOS transistor having a third source, a third drain, and a third gate, wherein the third source is coupled to the first drain, the second drain is coupled to the first gate, and the second gate is coupled to the third drain. In certain embodiments, the first PMOS transistor and the second NMOS transistor are turned on during the ESD event. Some aspects include a circuit having the gate driver control circuit including a third NMOS transistor having a fourth source, a fourth drain, and a fourth gate; and a pass-gate circuit including: a fourth NMOS transistor having a fifth source, a fifth drain, and a fifth gate; and a second PMOS transistor having a sixth source, a sixth drain, and a sixth gate, wherein the fourth drain is coupled to the second gate, the fourth gate is coupled to the fifth source and the sixth source, and the fifth drain is coupled to the sixth drain.

Additional aspects include a circuit having the gate driver control circuit including one or more diode-connected PMOS transistors having a seventh source and a seventh drain, wherein the seventh source is coupled to a power rail, the seventh drain is coupled to the fifth and sixth drains, and the second NMOS transistor is turned off and the third NMOS transistor is turned on during normal operations by current flowing from the power rail through the diode-connected PMOS transistors and the pass-gate circuit.

Other aspects include a circuit having an ESD clamp, wherein the gate driver control circuit includes a switch, and the ESD clamp controls the switch during an ESD event occurring from a power rail to the ground rail. In some embodiments, the ESD clamp is coupled to the fifth and sixth gates. Further aspects include a circuit having the ESD clamp including: a first inverter having first and second terminals; a second inverter having third and fourth terminals; and a fifth NMOS transistor having an eighth source, an eighth drain, and an eighth gate, wherein the eighth gate is coupled to the second terminal, the third terminal, and the sixth gate, and the fourth terminal is coupled to the fifth gate. Other aspects include a circuit having an ESD device coupled to the I/O pad and the first drain, wherein ESD current flows from the I/O pad to the ground rail through the ESD device during the ESD event.

An additional aspect of the present disclosure is a method including: providing a first NMOS transistor having a first source, a first drain, and a first gate; coupling the first source to a ground rail and the first drain to an I/O pad; coupling a gate driver control circuit to the first drain and the first gate;

and providing a ground potential to the first gate, via the gate driver control circuit, during an ESD event occurring from the I/O pad to the ground rail.

Another aspect includes the gate driver control circuit including: a second NMOS transistor having a second source, a second drain, and a second gate; and a first PMOS transistor having a third source, a third drain, and a third gate. Some aspects include: coupling the gate driver control circuit to the first drain and the first gate by coupling the third source to the first drain and coupling the second drain to the first gate; and coupling the second gate to the third drain. In certain embodiments, the first PMOS transistor and the second NMOS transistor are turned on during the ESD event. In various embodiments, the gate driver control circuit includes: a third NMOS transistor having a fourth source, a fourth drain, and a fourth gate; and a pass-gate circuit. The pass-gate circuit may, for instance, include: a fourth NMOS transistor having a fifth source, a fifth drain, and a fifth gate; and a second PMOS transistor having a sixth source, a sixth drain, and a sixth gate. Some aspects include: coupling the fourth drain to the second gate, the fourth gate to the fifth source and the sixth source, and the fifth drain to the sixth drain.

In other embodiments, the gate driver control circuit may include one or more diode-connected PMOS transistors having a seventh source and a seventh drain. Some aspects include: coupling the seventh source to a power rail, and the seventh drain to the fifth and sixth drains; and turning off the second NMOS transistor and turning on the third NMOS transistor during normal operations by enabling current flow from the power rail through the diode-connected PMOS transistors and the pass-gate circuit.

Further aspects include controlling, via an ESD clamp, a switch of the gate driver control circuit during the ESD event occurring from a power rail to the ground rail. An additional aspect includes coupling the ESD clamp to the fifth and sixth gates. In certain embodiments, the ESD clamp may include: a first inverter having first and second terminals; a second inverter having third and fourth terminals; and a fifth NMOS transistor having an eighth source, an eighth drain, and an eighth gate. Some aspects include: coupling the eighth gate to the second terminal, the third terminal, and the sixth gate; and coupling the fourth terminal to the fifth gate. Other aspects include coupling an ESD device to the I/O pad and the first drain, wherein ESD current flows from the I/O pad to the ground rail through the ESD device during the ESD event.

Another aspect of the present disclosure is an open-drain I/O driver circuit including: a first NMOS transistor having a first source, a first drain, and a first gate, the first source being coupled to a ground rail and the first drain being coupled to an I/O pad; and a gate driver control circuit that includes: a second NMOS transistor having a second source, a second drain, and a second gate; and a first PMOS transistor having a third source, a third drain, and a third gate, wherein the third source is coupled to the first drain, the second drain is coupled to the first gate, the second gate is coupled to the third drain, and the gate driver control circuit provides a ground potential to the first gate during an ESD event occurring from the I/O pad to the ground rail.

Various aspects include the open-drain I/O driver circuit having the gate driver control circuit including: a third NMOS transistor having a fourth source, a fourth drain, and a fourth gate; a pass-gate circuit including: a fourth NMOS transistor having a fifth source, a fifth drain, and a fifth gate; and a second PMOS transistor having a sixth source, a sixth drain, and a sixth gate, wherein the fourth drain is coupled to the second gate, the fourth gate is coupled to the fifth source and the sixth source, and the fifth drain is coupled to the sixth drain. In further embodiments, the open drain-I/O driver circuit has a ESD clamp including a first inverter having first and second terminals; a second inverter having third and fourth terminals; and a fifth NMOS transistor having a seventh source, a seventh drain, and a seventh gate, wherein the seventh gate is coupled to the second terminal, the third terminal, and the sixth gate, and the fourth terminal is coupled to the fifth gate.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawing and in which like reference numerals refer to similar elements and in which.

DETAILED DESCRIPTION

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments. In addition, unless otherwise indicated, all numbers expressing quantities, ratios, and numerical properties of ingredients, reaction conditions, and so forth used in the specification and claims are to be understood as being modified in all instances by the term "about."

The present disclosure addresses and solves problems of ESD zapping, for instance, from an I/O pad to a ground rail in an open-drain I/O driver circuit. The present disclosure addresses and solves such problems, for instance, by, inter alia, providing a ground potential, via a gate driver control circuit, to the gate of a driver transistor coupled to an I/O pad when an ESD event occurs at the I/O pad, thereby turning off the driver transistor during the ESD event to prevent ESD current from breaking down the driver transistor.

Figure 1:
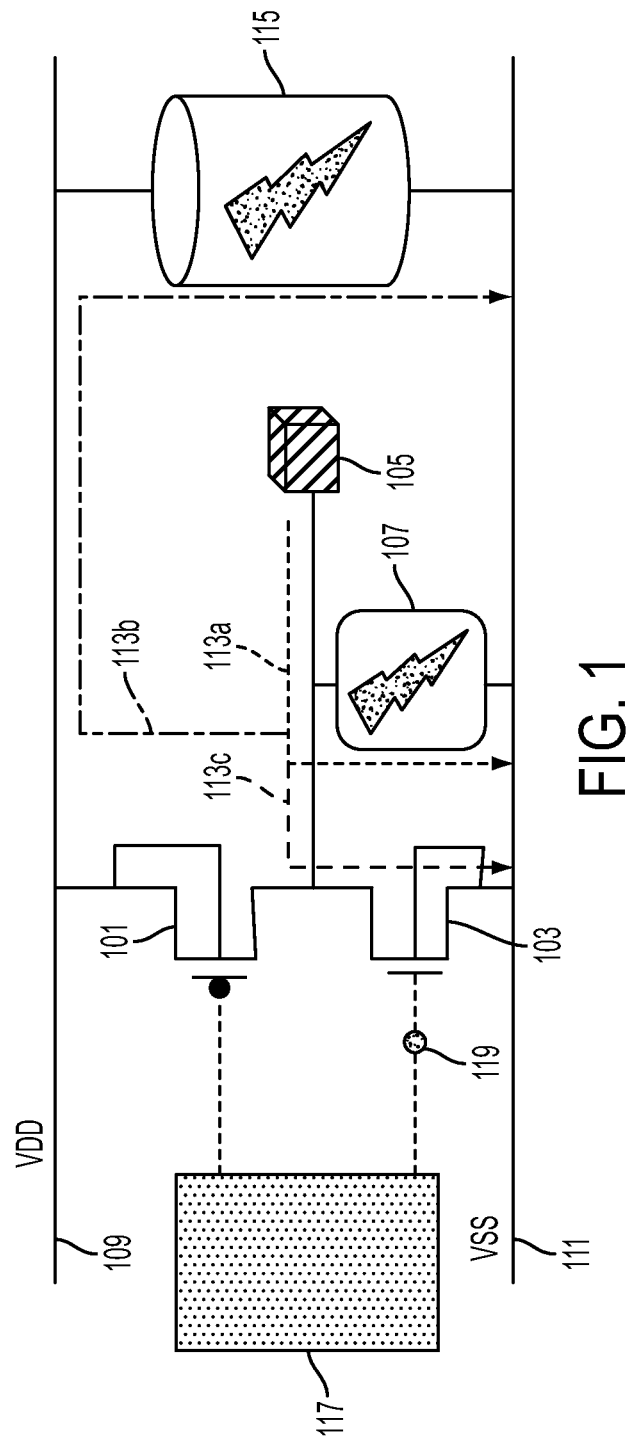
FIG. 1 schematically illustrates a traditional GPIO driver circuit.
Figure 2:
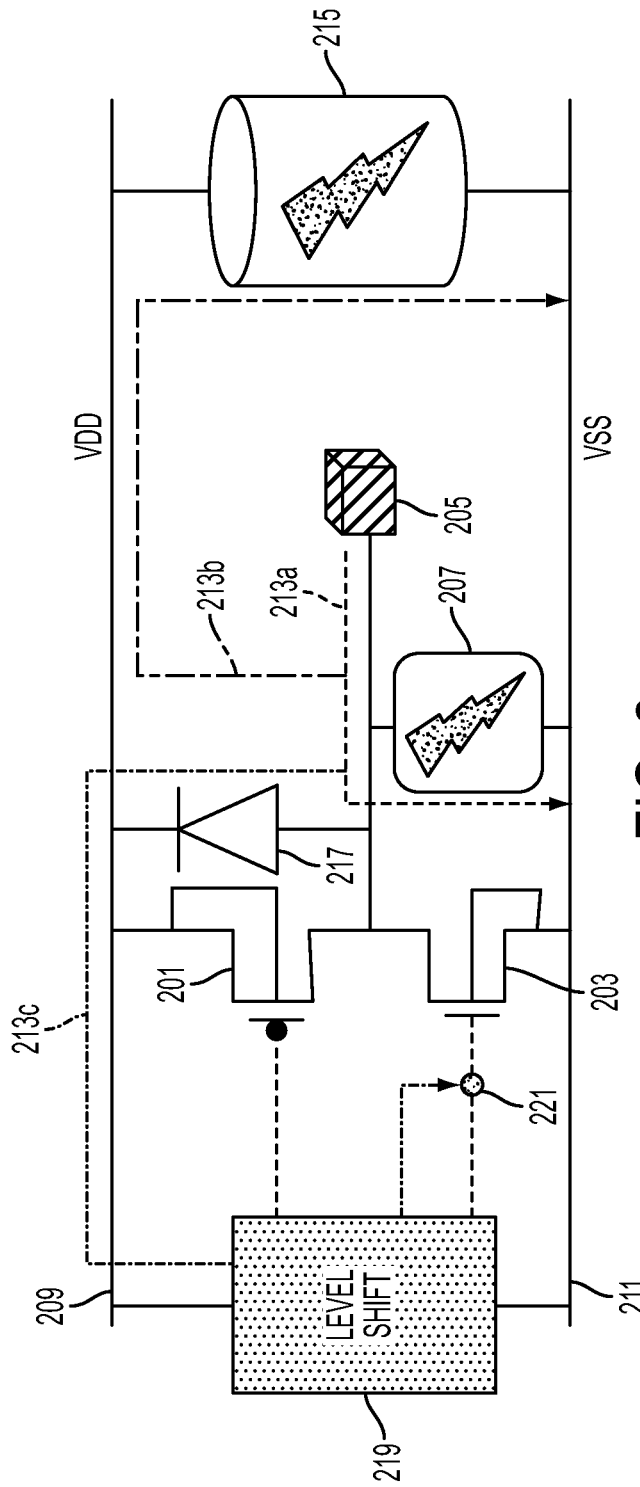
FIG. 2 schematically illustrates one solution to the floating gate issue in the circuit of FIG. 1.
Figure 3A:
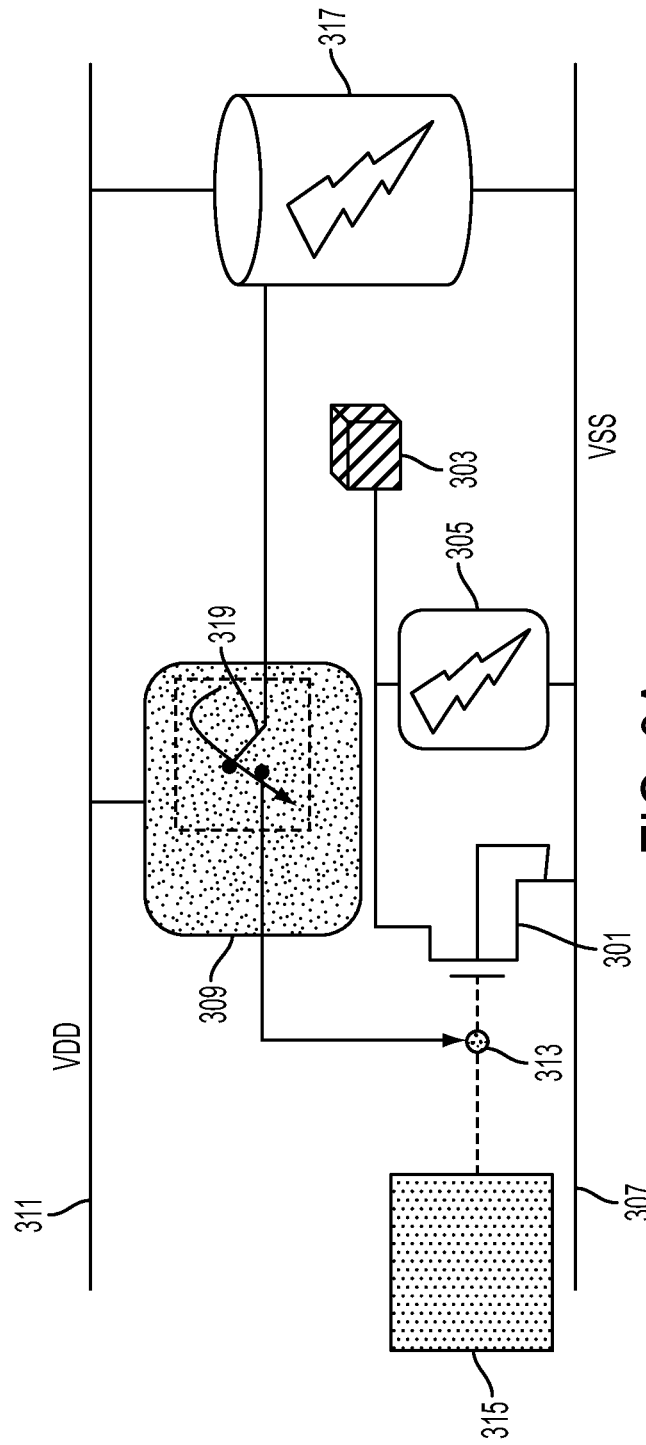
FIGS. 3A and 3B schematically illustrate an ESD-robust open-drain I/O driver circuit, in accordance with an exemplary embodiment of the present disclosure.
Figure 3B:
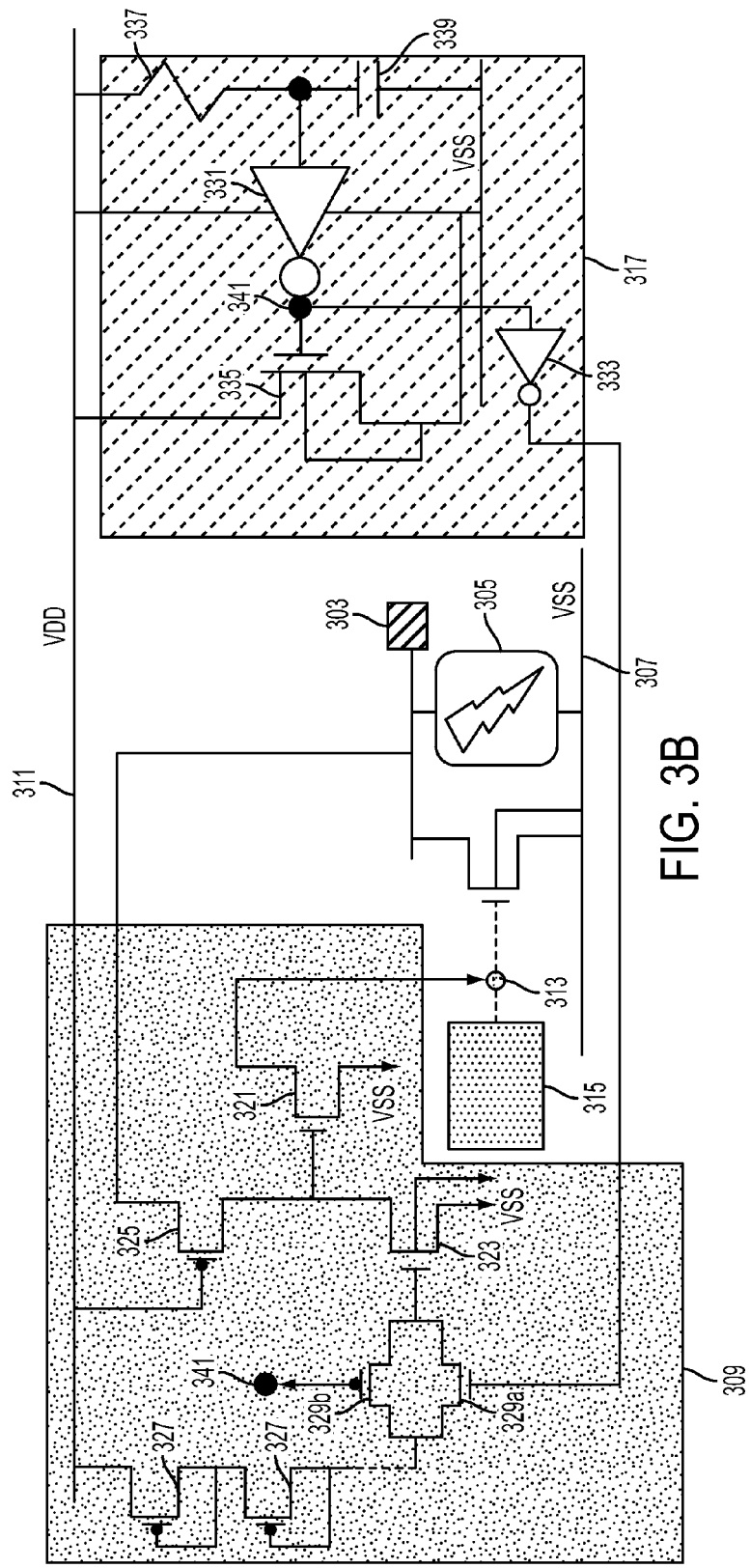

FIGS. 3A and 3B schematically illustrate an ESD-robust open-drain I/O driver circuit, in accordance with an exemplary embodiment of the present disclosure. For example, the circuit shown in FIG. 3A includes NMOS transistor 301 (e.g., driver transistor) having a drain coupled to I/O pad 303 and ESD device 305, a source coupled to ground rail 307, and a gate coupled to a gate driver control circuit 309. As illustrated, the circuit in FIG. 3A does not include a parasitic path from I/O pad 303 to power rail 311, rendering the proposed solution discussed with respect to FIG. 2 inapplicable. Nonetheless, when an ESD event occurs at I/O pad 303 (e.g., ESD zapping from I/O pad 303 to ground rail 307), gate driver control circuit 309 will feed a ground potential to gate node 313, which prevents ESD current from flowing through and breaking down NMOS transistor 301 (e.g., NMOS transistor 301 is turned off despite any potential output of control logic circuit 315). Moreover, ESD clamp 317 (e.g., I/O active ESD power clamp) controls switch 319 by turning on/off switch 319. Specifically, ESD clamp 317 sends a signal to switch off ESD current that may damage transistors inside gate driver control circuit 309 during VDD to VSS ESD zapping (e.g., an ESD event from power rail 311 to ground rail 307).

FIG. 3B illustrates a more detailed exemplary embodiment of the ESD-robust open-drain I/O driver circuit. As shown, gate driver control circuit 309 includes NMOS transistors 321 and 323, PMOS transistor 325, one or more diode-connected PMOS transistors 327 (although shown as two PMOS transistors, the number depends on the power supply application), and pass-gate 329 (including NMOS transistor 329a and PMOS transistor 329b). ESD clamp 317 includes inverters 331 and 333, NMOS transistor 335, resistor 337, and capacitor 339. Under normal operation, node 341 is at zero, causing pass-gate 329 to be on. Accordingly, the VDD signal will travel through diode-connected PMOS transistors 327 and pass-gate 329 to turn on NMOS transistor 323. Thus, NMOS transistor 321 will be off. During this time, PMOS transistor 325 is also off due to the VDD signal. Consequently, during normal operation, there is no functional impact of the gate driver control circuit 309 on the rest of the open-drain I/O driver circuit.

On the other hand, during ESD testing from I/O pad 303 to ground rail 307 with positive zapping, for instance, power rail 311 may be floating (e.g., near zero potential), resulting in PMOS transistor 325 and NMOS transistor 321 being on, and, thus, gate node 313 is pulled down to zero potential. In the meantime, diode-connected PMOS transistors 327, pass-gate 329, and NMOS transistor 323 are off. As such, diode-connected PMOS transistors 327, pass-gate 329, and NMOS transistor 323 do not functionally affect the potential state of gate node 313. Therefore, gate node 313 is kept at zero during the ESD event occurring at I/O pad 303, and the ESD current can bypass from I/O pad 303 to VSS via the desired ESD device 305.

Furthermore, under ESD zapping from power rail 311 to ground rail 307, ESD clamp 317 will be activated, causing ESD clamp 317 to feed the corresponding signal to turn off pass-gate 329. Accordingly, ESD current is prevented from going through diode-connected PMOS transistors 327 and damaging NMOS transistor 329a of pass-gate 329 (e.g. by breaking down the gate oxide).

The embodiments of the present disclosure can achieve several technical effects, including ESD robustness for open-drain I/O driver circuits. Embodiments of the present disclosure enjoy utility in various industrial applications as, for example, microprocessors, smart phones, mobile phones, cellular handsets, set-top boxes, DVD recorders and players, automotive navigation, printers and peripherals, networking and telecom equipment, gaming systems, digital cameras, or any other devices utilizing logic or high-voltage technology nodes. The present disclosure therefore enjoys industrial applicability in any of various types of highly integrated semiconductor devices, including devices that use ESD protection devices to pass ESD/Latch-up standards specifications (e.g., light crystal display (LCD) drivers, synchronous random access memories (SRAM), One Time Programming (OTP), power management products, etc.).

In the preceding description, the present disclosure is described with reference to specifically exemplary embodiments thereof. It will, however, be evident that various modifications and changes may be made thereto without departing from the broader spirit and scope of the present disclosure, as set forth in the claims. The specification and drawings are, accordingly, to be regarded as illustrative and not as restrictive. It is understood that the present disclosure is capable of using various other combinations and embodiments and is capable of any changes or modifications within the scope of the inventive concept as expressed herein.

What is claimed is:

1. A circuit comprising:
   a first NMOS transistor having a first source, a first drain, and a first gate, the first source being coupled to a ground rail and the first drain being coupled to an I/O pad; and
   a gate driver control circuit coupled to the first drain and the first gate, wherein the gate driver control circuit provides a ground potential to turn off the first gate during an ESD event occurring from the I/O pad to the ground rail; and
   wherein the gate driver control circuit comprises:
   a second NMOS transistor having a second source, a second drain, and a second gate; and
   a first PMOS transistor having a third source, a third drain, and a third gate, wherein the third source is coupled to the first drain, the second drain is coupled to the first gate, the second source is coupled to the ground rail, and the second gate is coupled to the third drain.

2. The circuit according to claim 1, wherein the first PMOS transistor and the second NMOS transistor are turned on during the ESD event.

3. The circuit according to claim 1, wherein the gate driver control circuit comprises:
   a third NMOS transistor having a fourth source, a fourth drain, and a fourth gate; and
   a pass-gate circuit including:
      a fourth NMOS transistor having a fifth source, a fifth drain, and a fifth gate; and
      a second PMOS transistor having a sixth source, a sixth drain, and a sixth gate, wherein the fourth drain is coupled to the second gate, the fourth gate is coupled to the fifth source and the sixth source, and the fifth drain is coupled to the sixth drain.

4. The circuit according to claim 3, wherein the gate driver control circuit comprises:
   one or more diode-connected PMOS transistors having a seventh source and a seventh drain, wherein the seventh source is coupled to a power rail, the seventh drain is coupled to the fifth and sixth drains, and the second NMOS transistor is turned off and the third NMOS transistor is turned on during normal operations by current flowing from the power rail through the diode-connected PMOS transistors and the pass-gate circuit.

5. The circuit according to claim 3, comprising:
   an ESD clamp, wherein the gate driver control circuit includes a switch, and the ESD clamp controls the switch during an ESD event occurring from a power rail to the ground rail.

6. The circuit according to claim 5, wherein the ESD clamp is coupled to the fifth and sixth gates.

7. The circuit according to claim 5, wherein the ESD clamp includes:
   a first inverter having first and second terminals;
   a second inverter having third and fourth terminals; and
   a fifth NMOS transistor having an eighth source, an eighth drain, and an eighth gate, wherein the eighth gate is coupled to the second terminal, the third terminal, and the sixth gate, and the fourth terminal is coupled to the fifth gate.

8. The circuit according to claim 1, comprising:
an ESD device coupled to the I/O pad and the first drain, wherein ESD current flows from the I/O pad to the ground rail through the ESD device during the ESD event.

9. A method comprising:
providing a first NMOS transistor having a first source, a first drain, and a first gate;
coupling the first source to a ground rail and the first drain to an I/O pad;
coupling a gate driver control circuit to the first drain and the first gate; and
providing a ground potential to turn off the first gate, via the gate driver control circuit, during an ESD event occurring from the I/O pad to the ground rail;
wherein the gate driver control circuit comprises:
a second NMOS transistor having a second source, a second drain, and a second gate; and
a first PMOS transistor having a third source, a third drain, and a third gate, the method comprising:
coupling the gate driver control circuit to the first drain and the first gate by coupling the third source to the first drain and coupling the second drain to the first gate;
coupling the second source to the ground rail; and
coupling the second gate to the third drain.

10. The method according to claim 9, wherein the first PMOS transistor and the second NMOS transistor are turned on during the ESD event.

11. The method according to claim 9, wherein the gate driver control circuit comprises:
a third NMOS transistor having a fourth source, a fourth drain, and a fourth gate; and
a pass-gate circuit including: a fourth NMOS transistor having a fifth source, a fifth drain, and a fifth gate; and a second PMOS transistor having a sixth source, a sixth drain, and a sixth gate, the method comprising:
coupling the fourth drain to the second gate, the fourth gate to the fifth source and the sixth source, and the fifth drain to the sixth drain.

12. The method according to claim 11, wherein the gate driver control circuit comprises one or more diode-connected PMOS transistors having a seventh source and a seventh drain, the method comprising:
coupling the seventh source to a power rail, and the seventh drain to the fifth and sixth drains; and
turning off the second NMOS transistor and turning on the third NMOS transistor during normal operations by enabling current flow from the power rail through the diode-connected PMOS transistors and the pass-gate circuit.

13. The method according to claim 11, comprising:
controlling, via an ESD clamp, a switch of the gate driver control circuit during the ESD event occurring from a power rail to the ground rail.

14. The method according to claim 13, comprising:
coupling the ESD clamp to the fifth and sixth gates.

15. The method according to claim 13, wherein the ESD clamp comprises:
a first inverter having first and second terminals;
a second inverter having third and fourth terminals; and
a fifth NMOS transistor having an eighth source, an eighth drain, and an eighth gate, the method comprising:
coupling the eighth gate to the second terminal, the third terminal, and the sixth gate; and
coupling the fourth terminal to the fifth gate.

16. The method according to claim 9, comprising:
coupling an ESD device to the I/O pad and the first drain, wherein ESD current flows from the I/O pad to the ground rail through the ESD device during the ESD event.

17. An open-drain I/O driver circuit comprising:
a first NMOS transistor having a first source, a first drain, and a first gate, the first source being coupled to a ground rail and the first drain being coupled to an I/O pad; and
a gate driver control circuit comprising:
a second NMOS transistor having a second source, a second drain, and a second gate; and
a first PMOS transistor having a third source, a third drain, and a third gate,
wherein the third source is coupled to the first drain, the second drain is coupled to the first gate, the second gate is coupled to the third drain, and the gate driver control circuit provides a ground potential to turn off the first gate during an ESD event occurring from the I/O pad to the ground rail.

18. The open-drain I/O driver circuit according to claim 17, wherein the gate driver control circuit comprises:
a third NMOS transistor having a fourth source, a fourth drain, and a fourth gate;
a pass-gate circuit including: a fourth NMOS transistor having a fifth source, a fifth drain, and a fifth gate; and a second PMOS transistor having a sixth source, a sixth drain, and a sixth gate, wherein the fourth drain is coupled to the second gate, the fourth gate is coupled to the fifth source and the sixth source, and the fifth drain is coupled to the sixth drain; and
wherein the open drain-PO driver circuit further comprises a ESD clamp including:
a first inverter having first and second terminals;
a second inverter having third and fourth terminals; and
a fifth NMOS transistor having a seventh source, a seventh drain, and a seventh gate,
wherein the seventh gate is coupled to the second terminal, the third terminal, and the sixth gate, and the fourth terminal is coupled to the fifth gate.

* * * * *